US009731887B2

(12) United States Patent
Park

(10) Patent No.: US 9,731,887 B2
(45) Date of Patent: Aug. 15, 2017

(54) RUBBER SEAL FOR VACUUM RECEPTACLE AND LID FOR THE RECEPTACLE USING THE SAME

(71) Applicant: BORU INTERNATIONAL CO., LTD., Yongin-si, Gyeonggi-do (KR)

(72) Inventor: Jun Young Park, Busan (KR)

(73) Assignee: BORU INTERNATIONAL CO. LTD., Gyeonggi-Do (KR)

( * ) Notice: Subject to any disclaimer, the term of this patent is extended or adjusted under 35 U.S.C. 154(b) by 420 days.

(21) Appl. No.: 14/380,426

(22) PCT Filed: Feb. 15, 2013

(86) PCT No.: PCT/KR2013/001214
§ 371 (c)(1),
(2) Date: Aug. 22, 2014

(87) PCT Pub. No.: WO2013/125813
PCT Pub. Date: Aug. 29, 2013

(65) Prior Publication Data
US 2015/0060446 A1 Mar. 5, 2015

(30) Foreign Application Priority Data

Feb. 24, 2012 (KR) ......................... 10-2012-0019261

(51) Int. Cl.
*B65D 51/16* (2006.01)
*B65D 81/20* (2006.01)
(Continued)

(52) U.S. Cl.
CPC ..... *B65D 81/2038* (2013.01); *B65D 51/1683* (2013.01); *B65D 53/02* (2013.01);
(Continued)

(58) Field of Classification Search
CPC ............ B65D 81/2038; B65D 81/2015; B65D 51/1683; B65D 53/02; B65D 2543/00972;
(Continued)

(56) References Cited

U.S. PATENT DOCUMENTS

2005/0051558 A1* 3/2005 Hagano .............. B60K 15/0406
220/304
2010/0270304 A1* 10/2010 Chen .................... B65D 43/022
220/231

FOREIGN PATENT DOCUMENTS

JP 56-103455 A 1/1955
JP 2004-197882 A 7/2004
(Continued)

*Primary Examiner* — James N Smalley
(74) *Attorney, Agent, or Firm* — Roberts Mlotkowski; Safran Cole & Calderon P.C

(57) ABSTRACT

Disclosed is a rubber seal for a vacuum receptacle. The rubber seal is not released by a negative pressure developed in the vacuum receptacle. In addition, the rubber seal is excellent in sealing force, and has a body portion that does not bulge outward while being readily mounted on a lid body. The rubber seal includes: the body portion that surrounds the lateral side of an inner space and extends vertically; an elastic sealing wing portion formed to extend outward from the body portion and provided along the circumference of the body portion; and a multi-functional wing portion formed to extend outward from the body portion above the elastic sealing wing portion, and provided along the circumference of the body portion.

11 Claims, 10 Drawing Sheets

(51) Int. Cl.
*B65D 53/02* (2006.01)
*F16J 15/02* (2006.01)
*B65D 43/02* (2006.01)

(52) U.S. Cl.
CPC ........ *B65D 81/2015* (2013.01); *F16J 15/025* (2013.01); *B65D 43/0202* (2013.01); *B65D 2543/00564* (2013.01); *B65D 2543/00972* (2013.01)

(58) Field of Classification Search
CPC ........ B65D 43/0202; B65D 2543/00564; F16J 15/025
USPC .......... 220/231, 378, 806; 277/647; 215/262
See application file for complete search history.

(56) References Cited

FOREIGN PATENT DOCUMENTS

| | | |
|---|---|---|
| KR | 1999-0042019 U | 12/1999 |
| KR | 1020100078576 A | 7/2010 |

\* cited by examiner

RUBBER SEAL FOR VACUUM RECEPTACLE AND LID FOR THE RECEPTACLE USING THE SAME

TECHNICAL FIELD

The present invention relates to an improvement of a rubber sealing member, and more particularly to an improvement of a rubber sealing member suitable for use in a vacuum receptacle. Such a rubber sealing member is typically referred to as a rubber packing or a rubber seal.

BACKGROUND ART

In general, wet food goes bad readily in the air under atmospheric pressure. Typically, food is filled in an ordinary food receptacle and stored in a refrigerator. However, it is difficult to keep food for a long period merely by filling the food in the food receptacle, and storing the food in the refrigerator in that state.

In order to store food for a longer period, a multi-purpose vacuum receptacle lid has been developed in which a check valve is provided in the lid, and the air inside a receptacle is bled to evacuate the inside of the receptacle to a pressure below atmospheric pressure so as to keep food in the receptacle.

FIG. 1 is a cross-sectional view illustrating an example of a conventional receptacle lid.

The vacuum receptacle lid 10 as illustrated in FIG. 1 has a lid body 11. The lid body 11 is provided with a valve mounting portion 14 at the central area thereof, and the valve mounting portion 14 is formed with a vent hole 12 and a valve coupling portion 13. A check valve 15 is coupled to the valve mounting portion 14. The check valve 15 serves to allow the air inside the vacuum receptacle to be discharged through the vent hole 12 while blocking ambient air from flowing into the inside of the vacuum receptacle. The check valve 15 is provided with a knob 15a in order to allow a person to lift a part of the check valve 15 so as to forcibly release the negative pressure developed in the vacuum receptacle.

A seal mounting portion 16 is formed along the peripheral edge of the bottom side of the lid body 11 to extend downward. The lid body 11 includes a laterally extending portion 17 that extends outward from the top end of the seal mounting portion 16, and a downwardly extending portion 18 that extends downward from the end of the laterally extending portion 17. An insertion recess 19 is formed on the bottom side of the lid body 11 and outside the top end of the seal mounting portion 16. The insertion recess 19 is provided in order to allow a rubber seal 20 mounted in the seal mounting portion 16 to be firmly installed in the seal mounting portion 16 so that the rubber seal 20 is not released from the seal mounting portion 16.

The rubber seal 20 includes: a body portion 21 mounted in such a manner that the inner circumferential surface is closely contacted with the outer circumferential surface of the seal mounting portion 16; and a close contact portion 22 extending outward from the bottom side of the body portion 21 and configured to come into close contact with a peripheral edge of the mouth opening of the vacuum receptacle so as to block ambient air from flowing into the inside of the vacuum receptacle.

FIG. 2 is a cross-sectional view illustrating another example of a conventional vacuum receptacle lid.

This example does not form an insertion recess on the bottom of the lid body 11 in order to remove a disadvantage of the vacuum receptacle lid 10 described with reference to FIG. 1. In this case, there is an advantage in that it is easy to mount the rubber seal 20 in the seal mounting portion 16. The remaining configuration is the same as that of FIG. 1.

The invention related to the above-described lids and rubber seal is disclosed in Korean Patent Laid-Open Publication No. 10-2010-0078576 entitled ≝ acuum Receptacle Lid, and Check Valve and Packing for the Same? and published on Jul. 8, 2010.

DISCLOSURE

Technical Problem

The inventor of the present invention has found that the vacuum receptacle lid 10 as illustrated in FIG. 1 has a disadvantage in that it is very difficult to mount the rubber seal 20 in the seal mounting portion 16 due to the insertion recess 19. That is, with the vacuum receptacle lid 10 as illustrated in FIG. 1, it is not only difficult to insert the top end of body portion 21 of the rubber seal 20 into the insertion recess 19, but also difficult and time-consuming to mount the rubber seal 20 wholly in the seal mounting portion 16 after the insertion because the inside of the insertion recess 19 is sealed and the air pressure inside the insertion recess 19 is increased after the insertion.

Also, the lid 10 illustrated in FIG. 1 may be unsanitary since water may remain in the insertion recess 19 for a long time, and foreign matter may be entrapped in the insertion recess 19.

In addition, the inventor of the present invention has found that the lid 10 illustrated in FIG. 2 has problems in that when the lid 10 is closed, the body portion 16 of the rubber seal 20 may bulge, and the rubber seal 20 blocks the lid body 11 only by the body portion 16 but the sealing force between the lid body 11 and the rubber seal 20 is low.

In addition, the inventor of the present invention has found that the lid 10 illustrated in FIG. 2 has a problem in that the rubber seal 20 is easily released by the negative pressure developed in the inside of the vacuum receptacle 40 in a state where the lid 10 is mounted on the receptacle body 30.

Furthermore, the inventor of the present invention has found that the rubber seal 20 illustrated in FIGS. 1 and 2 has a problem in that the close contact portion 22 is adhered to the bottom surface of the lid body 11 so that the close contact portion 22 is not returned to its original position frequently when the lid 10 mounted on the receptacle body 11 is opened.

Accordingly, the present invention has been made to solve the above-mentioned problems occurring in the prior art, and an object of the present invention is to provide a rubber seal for a vacuum receptacle, which is easily mounted in a lid body and provides an improved sealing force between the lid body and the rubber seal.

Another object of the present invention is to provide a rubber seal for a lid of a receptacle, which is not easily released from the lid body by negative pressure developed in a receptacle body after the rubber seal is mounted in the seal mounting portion of the receptacle body while being readily mounted in the lid body.

Yet another object of the present invention is to provide a rubber seal for a lid of a vacuum receptacle, which is provided with an elastic sealing wing portion that is not adhered to the bottom surface of the lid body when the lid is opened.

Still another object of the present invention is to provide a vacuum receptacle lid using a rubber seal according to the present invention.

Technical Solution

According to an aspect of the present invention, there is provided a rubber seal for a vacuum receptacle. The rubber seal includes: a body portion that surrounds the lateral side of an inner space and extends vertically; an elastic sealing wing portion formed to extend outward from the body portion and provided along the circumference of the body portion; and a multi-functional wing portion formed to extend outward from the body portion above the elastic sealing wing portion, and provided along the circumference of the body portion.

More specifically, there is provided a rubber seal installed in a lid body of a lid of a vacuum receptacle to seal a gap between the receptacle body and the lid body in such a manner that, when the lid is closed, the inner space of the vacuum receptacle can be shielded from the outside. The rubber seal includes: a body portion configured to surround the lateral side of an inner space and to extend vertically, and fitted on the outer circumferential surface of a seal mounting portion formed to extend downward in the lid body such that the inner circumferential surface of the body portion comes into close contact with the outer circumferential surface of the seal mounting portion, thereby primarily sealing a gap between the lid body and the rubber seal; an elastic sealing wing portion formed to extend outward from the bottom side of the body portion and provided along the circumference of the body portion such that the elastic sealing wing portion elastically comes into close contact with the edge of an opening of the receptacle body, thereby sealing a gap between the receptacle body and the rubber seal; and a multi-functional wing portion formed to protrude outward from the body portion above the elastic sealing wing portion and provided along the circumference of the body portion such that the multi-functional wing portion comes into contact with the bottom surface of the lid body, thereby secondarily sealing the gap between the lid body and the rubber seal and supporting the body portion to suppress the body portion from bulging outward.

Preferably, the multi-functional wing portion may extend to be inclined in such a manner that the height of the multi-functional wing portion is gradually increased as approaching the outer periphery of the multi-functional wing portion.

More preferably, an adhesion recess may be formed on the top surface of the multi-functional wing portion in such a manner that when the multi-functional wing portion is in contact with the bottom surface of the lid body, a sealed adhesion space is formed between the bottom surface of the lid body and the multi-functional wing portion.

The multi-functional wing portion may be formed in such a manner that the thickness of the multi-functional wing portion is reduced as approaching the outer periphery thereof so as to serve as a check valve that, when the outer peripheral edge of the multi-functional wing portion is in close contact with the bottom surface, allows the air in the adhesion recess side to flow out to the outside and prevents ambient air from flowing into the adhesion recess side.

The thickness of the multi-functional wing portion may be reduced as approaching the outer periphery of the multi-functional wing portion.

Preferably, the elastic wing portion may extend to be inclined in such a manner that the height of the elastic wing portion is gradually reduced as approaching the outer periphery thereof.

The thickness of the elastic sealing wing portion may be reduced as approaching the outer periphery of the elastic sealing wing portion.

The elastic sealing wing portion may be formed with one or more ventilation portions to allow a space formed between the elastic sealing wing portion and the multi-functional wing portion to be always communicated with an outer space.

The ventilation portions may be formed by passages between rims formed on the top surface of the elastic sealing wing portion to protrude upward, one or more radial grooves formed to extend from the top surface of the elastic sealing wing portion to the outer periphery of the elastic sealing wing portion, or one or more holes formed along the outer peripheral edge of the elastic sealing wing portion.

According to another aspect of the present invention, there is provided a lid for a vacuum receptacle for opening or closing an opening of a receptacle body provided with a space in which contents are stored. The lid includes: a lid body including a valve mounting portion formed with a vent hole and a valve coupling portion, a seal mounting portion formed along the periphery of the bottom surface of the valve mounting portion and extending downward, and a laterally extending portion extending outward from the seal mounting portion; a check valve mounted on the valve coupling portion to allow the air in the vacuum receptacle to be discharged to the outside through the vent hole while preventing ambient air from flowing into the inside of the vacuum receptacle; and a rubber seal. The rubber seal includes: a body portion fitted on the outer circumferential surface of the seal mounting portion to come into close contact with the outer circumferential surface of the seal mounting portion, thereby primarily sealing a gap between the lid body and the rubber seal; an elastic sealing wing portion formed to extend outward from the bottom side of the body portion and provided along the circumference of the body portion such that the elastic sealing wing portion elastically comes into close contact with the edge of the opening of the receptacle body as the lid body moves downward, thereby blocking the ambient air from flowing into the inside of the vacuum receptacle through a gap between the receptacle body and the rubber seal; and a multi-functional wing portion formed to protrude outward from the body portion above the elastic sealing wing portion and provided along the circumference of the body portion such that the multi-functional wing portion comes into contact with the bottom surface of the lid body, thereby secondarily sealing the gap between the lid body and the rubber seal and supporting the body portion to suppress the body portion from bulging outward.

In this case, an adhesion recess may also be formed on the top surface of the multi-functional wing portion in such a manner that, when the multi-functional wing portion is in contact with the bottom surface of the lid body, a sealed adhesion space is formed between the bottom surface of the lid body and the multi-functional wing portion.

Also, in this case, the multi-functional wing portion may be formed in such a manner that the thickness of the multi-functional wing portion is reduced as approaching the outer periphery of the multi-functional wing portion, thereby serving as a check valve that, when the outer peripheral edge of the multi-functional wing portion is in close contact with the bottom surface, allows the air in the adhesion recess side to flow out to the outside while blocking ambient air from flowing into the adhesion recess side.

Furthermore, in this case, the elastic sealing wing portion may also be formed with one or more ventilation portions to allow a space formed between the elastic sealing wing portion and the multi-functional wing portion to be always communicated with an outer space Advantageous Effects According to present invention, the multi-functional wing portion is adhered to the bottom surface of the lid body. Therefore, the inventive rubber seal is not released from the seal mounting portion even when a negative pressure is developed in the inside of the vacuum receptacle while being readily mounted on the seal mounting portion.

Also, according to the present invention, the multi-functional wing portion additionally seals the gap between the lid body and the rubber seal. Therefore, the inventive rubber seal is excellent in sealing force while being readily mounted on the seal mounting portion.

In addition, according to the present invention, the multi-functional wing portion supports the body portion at the outside of the top end of the body portion. Therefore, the inventive rubber seal does not allow the body portion to bulge outward even if the elastic sealing wing portion is compressed upward when the lid is closed while being readily mounted on the seal mounting portion.

Furthermore, according to the present invention, the multi-functional wing portion formed with the adhesion recess performs a check valve function. Therefore, the inventive rubber seal may be firmly fixed to the lid body.

Moreover, the rubber seal according to the present invention is formed with one or more ventilation portions in the elastic sealing wing portion. Therefore, the elastic sealing wing portion is always returned to its original position when the lid is opened.

DESCRIPTION OF DRAWINGS

The above and other objects, features and advantages of the present invention will be more apparent from the following detailed description taken in conjunction with the accompanying drawings, in which.

BEST MODE

Hereinafter, a preferred embodiment of the present invention will be described with reference to the accompanying drawings.

Figure 1:
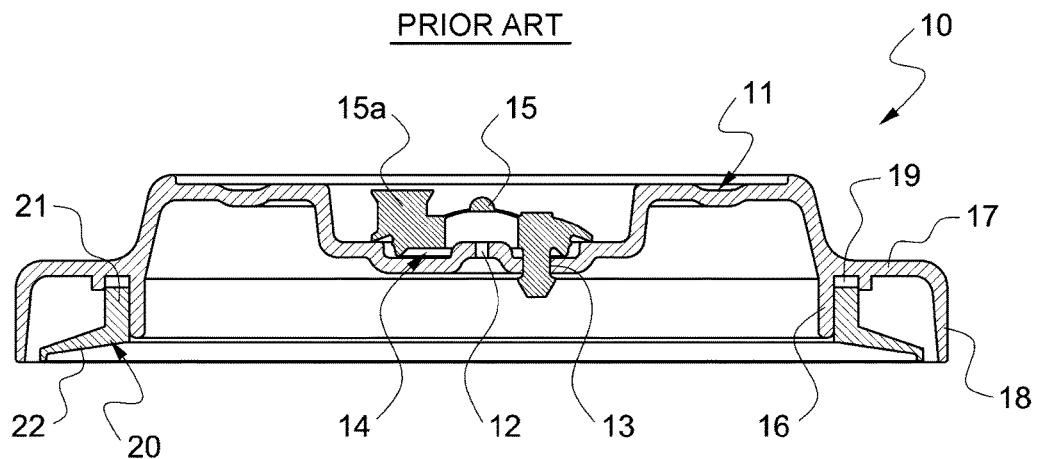
FIG. 1 is a cross-sectional view illustrating an example of a conventional vacuum receptacle lid.
Figure 2:
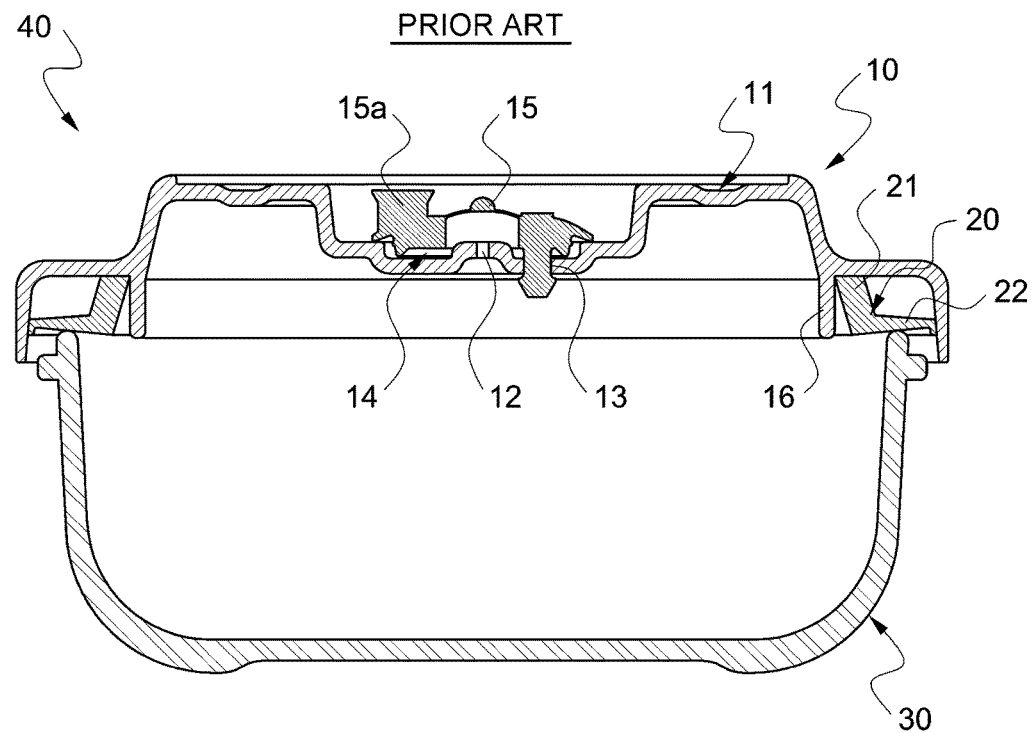
FIG. 2 is a cross-sectional view illustrating another example of a conventional vacuum receptacle lid.
Figure 3:
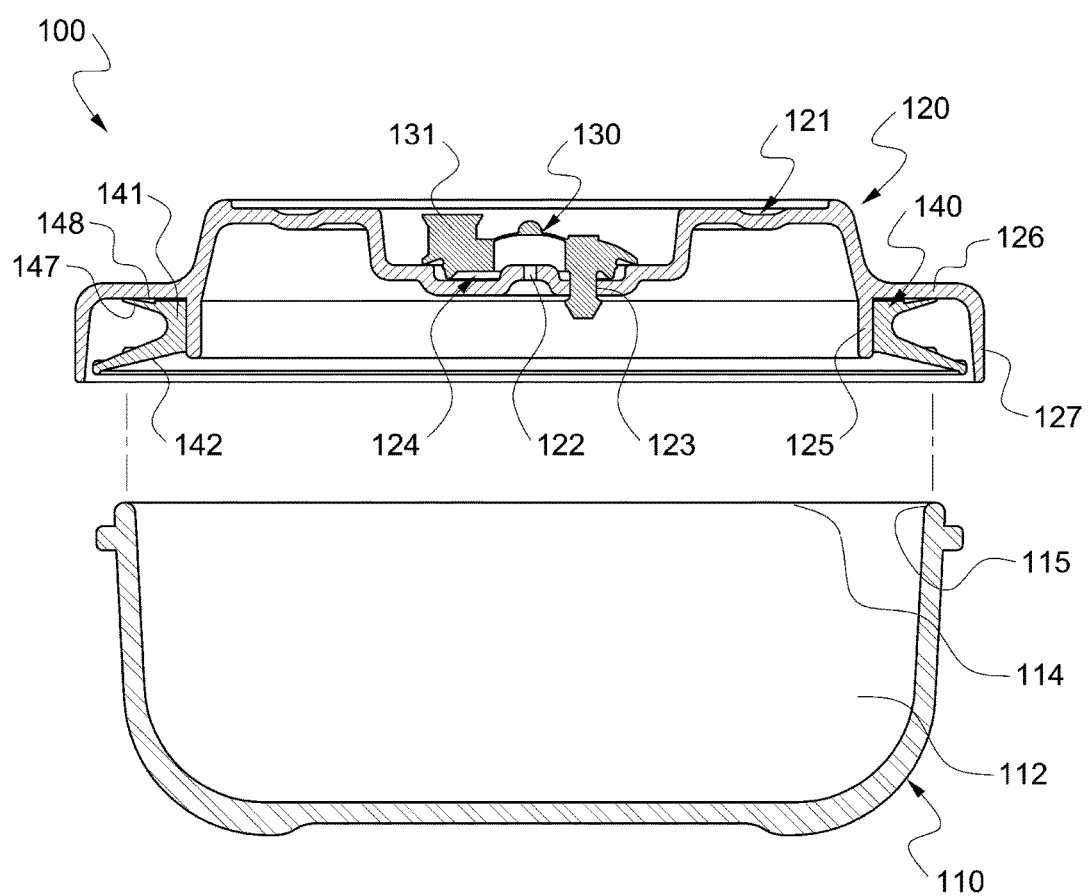
FIG. 3 is a cross-sectional view illustrating a vacuum receptacle in which the inventive rubber seal is mounted in the lid body in a state where the vacuum receptacle is opened.
Figure 4:
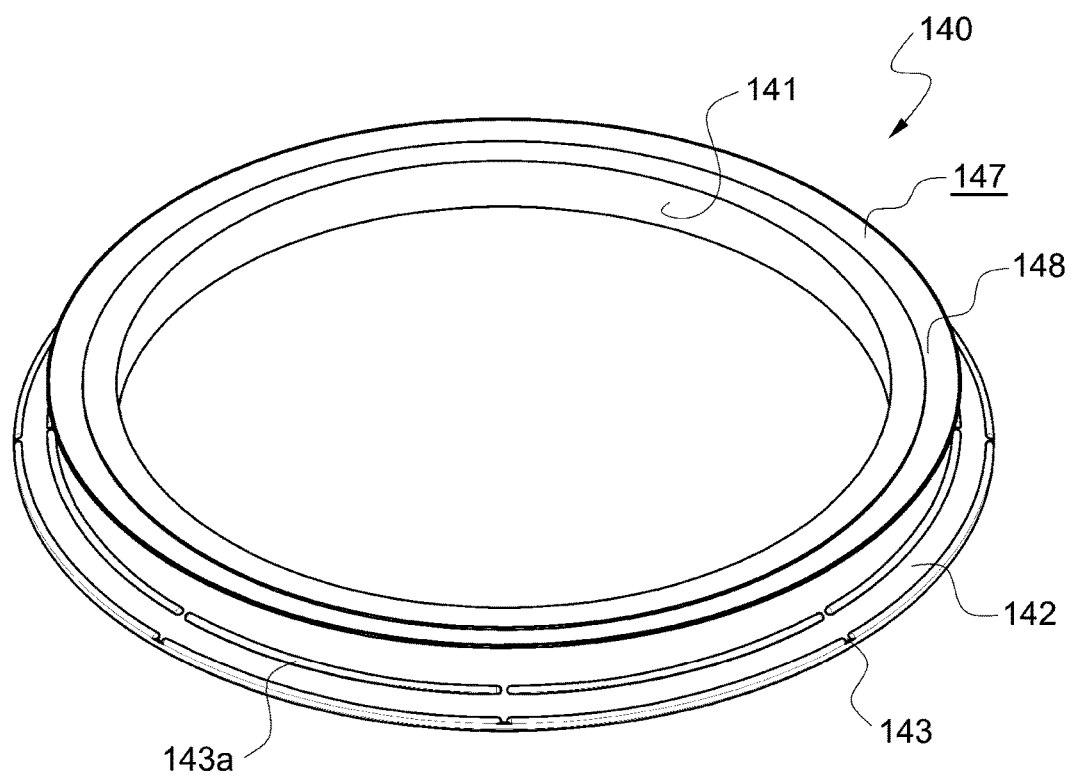
FIG. 4 is a perspective view of the inventive rubber seal.
Figure 5:
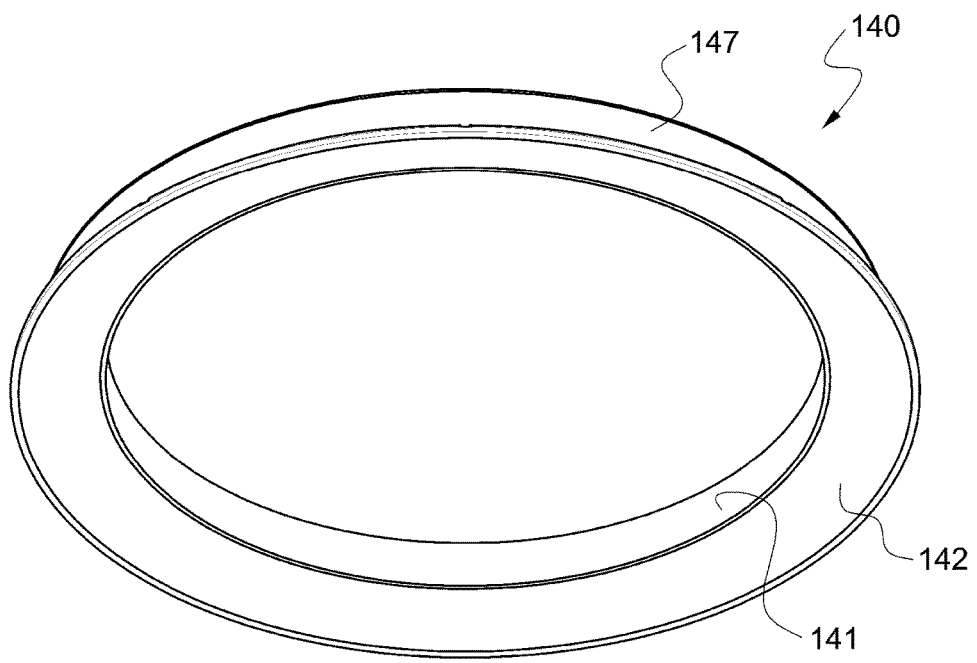
FIG. 5 is a bottom side perspective view of the inventive rubber seal illustrated in FIG. 4.
Figure 6:
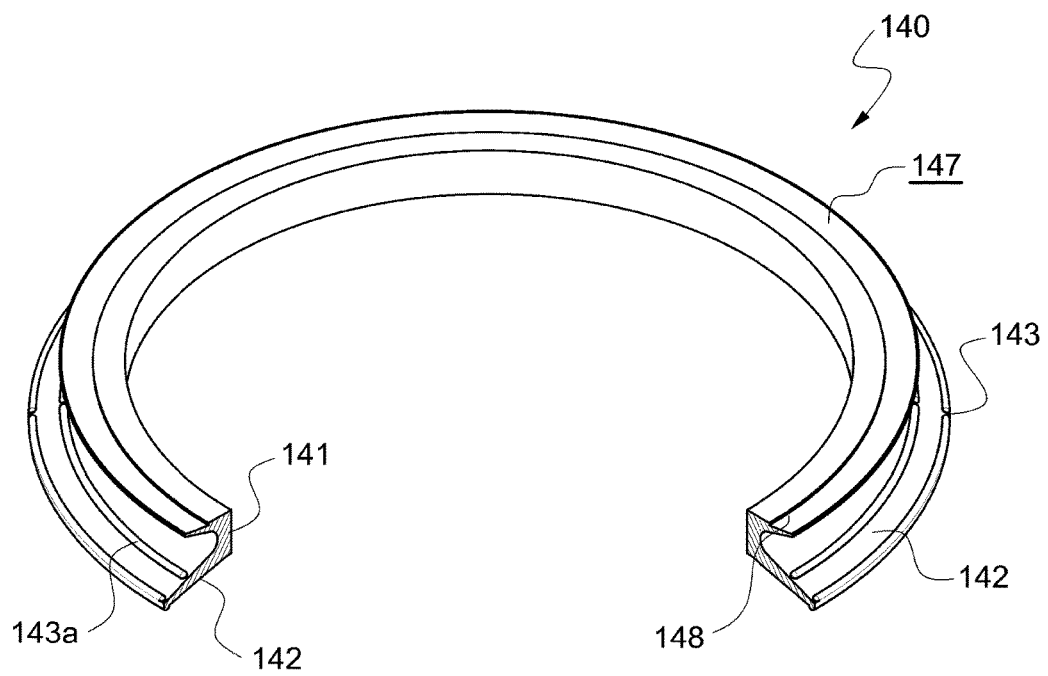
FIG. 6 is a perspective view partially in cross-section of the inventive rubber seal illustrated in FIG. 4.
Figure 7:
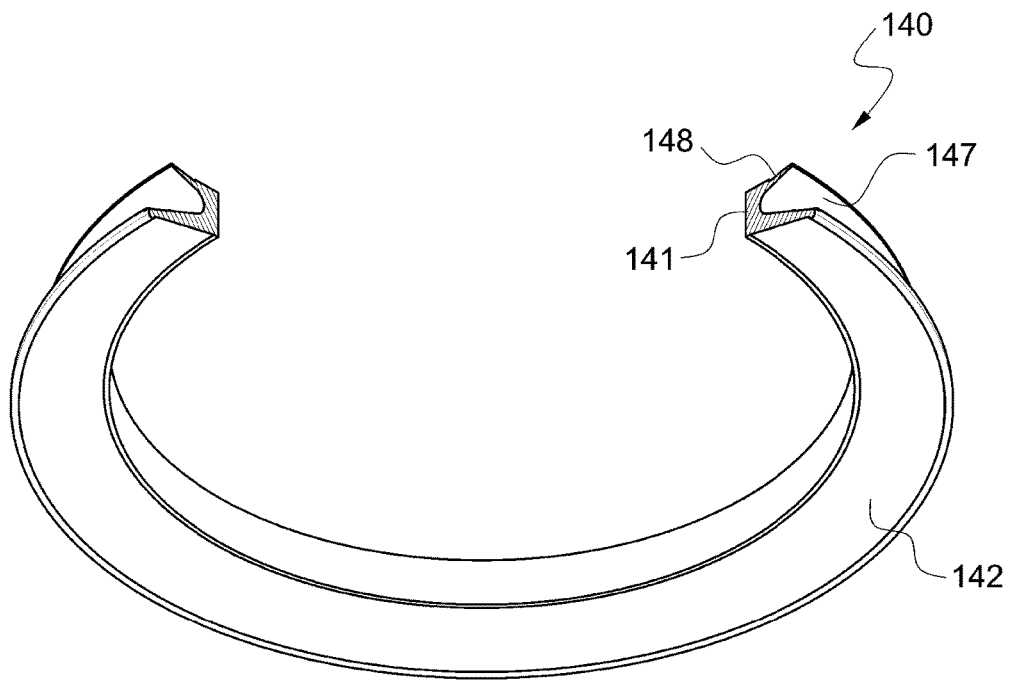
FIG. 7 is a bottom side perspective view partially in cross-section of the inventive rubber seal illustrated in FIG. 4.

FIG. 3 is a cross-sectional view illustrating a vacuum receptacle in which the inventive rubber seal is mounted in the lid body in a state where the vacuum receptacle is opened, and FIG. 4 is a perspective view of the inventive rubber seal. FIG. 5 is a bottom side perspective view of the inventive rubber seal illustrated in FIG. 4, FIG. 6 is a perspective view partially in cross-section of the inventive rubber seal illustrated in FIG. 4, and FIG. 7 is a bottom side perspective view partially in cross-section of the inventive rubber seal illustrated in FIG. 4.

The vacuum receptacle 100 illustrated in FIG. 3 includes an inner space 112 formed inside the vacuum receptacle 100, in which contents, for example, food or a product, may be contained, a receptacle body 110 formed with an opening 114 at the top thereof, and a lid 120 for opening or closing the opening 114.

The lid 120 includes a lid body 121 formed from a rigid material, for example, a plastic, a glass or a metal, a check valve 130, and a rubber seal 140. The check valve 130 and the rubber seal 140 are mounted on the lid body 121.

In the central area of the lid body 121, a vent hole 122 and a valve mounting portion 124 with a valve coupling portion 123 are formed. In addition, the lid body 121 is formed with a seal mounting portion 125 along the peripheral edge of the bottom thereof. The lid body 121 includes a laterally extending portion 126 that extends outward from the top end of the seal mounting portion 125, and a downwardly extending portion 127 that extends downward from the outer end of the laterally extending portion 126.

The valve mounting portion 124 is equipped with a check valve 130 that allows the air inside the vacuum receptacle 100 to flow out to the outside through the vent hole 122 while blocking the ambient air from flowing into the inside of the vacuum receptacle 100.

The seal mounting portion 125 is equipped with a rubber seal 140 according to the present invention.

Referring to FIGS. 4 to 7, the inventive rubber seal 140 for a vacuum receptacle includes a body portion 141. The body portion 141 is arranged along a closed path to surround the lateral side of the inner space in the inside thereof, and has upper and lower extension parts. The body portion 141 is mounted in such a manner that the inner circumferential surface of the body portion 141 comes into close contact with the outer circumferential surface of the seal mounting portion 125 formed to extend downward on the lid body 121.

The body portion 141 is formed to be thick as compared to the other portions such that the body portion 141 may have a sufficient supporting force in the state where it is mounted on the seal mounting portion 125. The body portion 141 primarily seals a gap between the lid body 121 and the rubber seal 140 in the state where the body portion 141 is mounted on the seal mounting portion 125, thereby blocking the air from flowing into the inside of the vacuum receptacle 100 or exiting from the inside of the vacuum receptacle 100 lid through the gap between the lid body 121 and the rubber seal 140.

In the present exemplary embodiment, the body portion 141 has an annular ring shape. However, the body portion may have any shape, for example, a square shape, a rectangular shape, or an oval shape according to the shape of the seal mounting portion 125.

In the bottom side of the body portion 141, an elastic sealing wing portion 142 is formed to protrude outward from the body portion 141. The elastic sealing wing portion 142 is provided along the circumference of the body portion 141. Preferably, the elastic sealing wing portion 142 extends outward in such a manner that the height of the elastic sealing wing portion 142 is gradually reduced as approaching the outer periphery of the elastic sealing wing portion 142. As a result, the elastic sealing wing portion 142 is arranged to be inclined downward. Furthermore, the thickness of the elastic sealing wing portion 142 is gradually reduced as approaching the outer periphery of the elastic sealing wing portion 142. The elastic sealing wing portion 142 elastically comes into close contact with the peripheral edge 115 of the opening 114 of the receptacle body 110 as the lid body 121 is lowered, thereby blocking the ambient air from flowing into the inside of the vacuum receptacle 100 through the gap between the rubber seal 140 and the receptacle body 110.

On the top of the elastic sealing wing portion 142, one or more ventilation portions 143 are formed so as to allow a space formed between the elastic sealing wing portion 142 and a multi-functional wing portion 147 to be communicated with an outer space. The multi-functional wing portion 147 will be described later. The ventilation portions 143 are provided in order to ensure that when the elastic sealing wing portion 142 is pushed upward by the receptacle body 110, the end portion of the elastic sealing wing portion 142 is in contact with the bottom surface of the lid body 121 or the multi-functional wing portion 147, and then when the lid 120 is opened, the space between the elastic sealing wing portion 142 and the multi-functional wing portion 147 is caused to be unsealed, thereby allowing the elastic sealing wing portion 142 to be readily returned to its original position.

Preferably, the ventilation portions 143 may be provided by forming rims 143a arranged in the circumferential direction on the top surface of the elastic sealing wing portion 142 to protrude upward and to be spaced apart from each other so that a passage is formed between each two adjacent rims through which air can flow radially.

Alternatively, the ventilation portions 143 may be provided by forming radial grooves or holes in the vicinity of the outer peripheral edge of the elastic sealing wing portion 142 rather than forming the rims 143a on the top surface of the elastic sealing wing portion 142.

The inventive rubber seal 140 includes a multi-functional wing portion 147. The multi-functional wing portion 147 is formed to protrude outward from the body portion 141 above the elastic sealing wing portion 142, and to extend along the outer circumference of the body portion 141. Preferably, the multi-functional wing portion 147 extends to be inclined in such a manner that the height of the multi-functional wing portion 147 is gradually increased as approaching the outer periphery of the multi-functional wing portion 147, and the thickness of the multi-functional wing portion 1147 is also reduced as approaching the outer periphery of the multi-functional wing portion 147.

More preferably, an adhesion recess 148 is formed on the top surface of the multi-functional wing portion 147. Preferably, the adhesion recess 148 is formed along the entire circumference of the multi-functional wing portion 147. The adhesion recess 148 is provided in order to ensure that a sealed adhesion space is formed between the multi-functional wing portion 147 and the bottom surface of the lid body 121 in the state where the multi-functional wing portion 147 is in close contact with the lid body 121. As a result, the multi-functional wing portion 147 serves as a check valve that allows the air in the adhesion recess 148 to flow out to the outside in the state where the outer peripheral edge thereof is in close contact with the bottom surface of the lid body 121 while blocking the ambient air from flowing into the adhesion recess 148 side.

Alternatively, two or more adhesion recesses 148 may be formed to be spaced apart from each other in the radial direction.

The adhesion recess 148 may be formed by a plurality of sections arranged in the circumferential direction and spaced apart from each other by a predetermined angular interval.

The multi-functional wing portion 147 is the most characteristic portion in the present invention, and serves to secondarily seal the gap between the lid body 121 and the rubber seal 140 by being contacted with the bottom surface of the lid body 121.

In addition, the multi-functional wing portion 147 supports the body portion 141 at the top end of the body portion 141 so as to prevent the body portion 141 from bulging outward when the lid 120 is closed.

FIGS. 8 to 11 are cross-sectional views illustrating a process of mounting the inventive rubber seal on the seal mounting portion 125 of the lid body 121.

Figure 8:
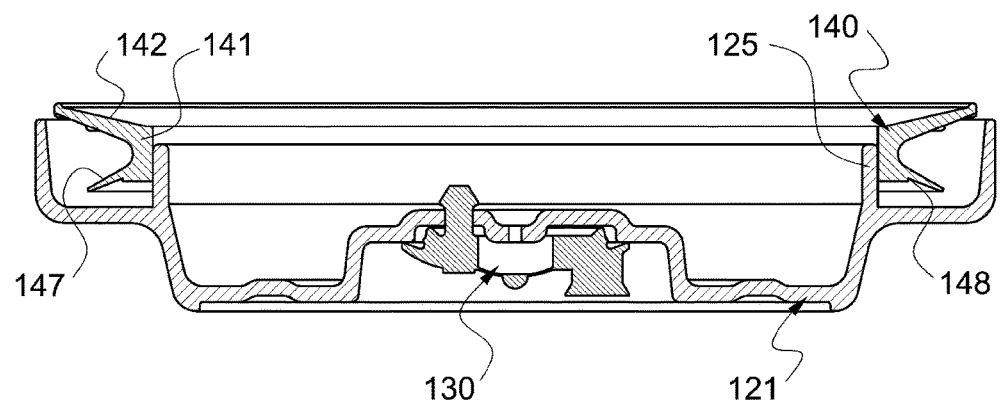
FIGS. 8 to 11 are cross-sectional views illustrating a process of mounting the inventive rubber seal in a seal mounting portion of a lid body.
Figure 9:
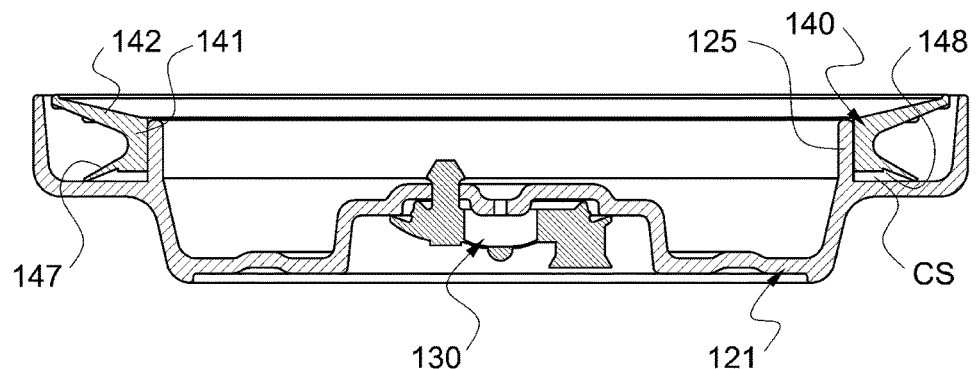

As illustrated in FIG. 8, in the state where the lid body 121 is reversed upside down, when the body portion 141 of the rubber seal 140 is fitted on the outer circumferential surface of the seal mounting portion 125 and then a downward force is applied to the rubber seal 140, the rubber seal 140 is moved downward, and the outer peripheral edge of the multi-functional wing portion 147 comes into contact with the bottom surface of the lid body 121 as illustrated in FIG. 9, thereby forming a closed space CS between the multi-functional wing portion 147 and the bottom surface of the lid body 121.

Figure 10:
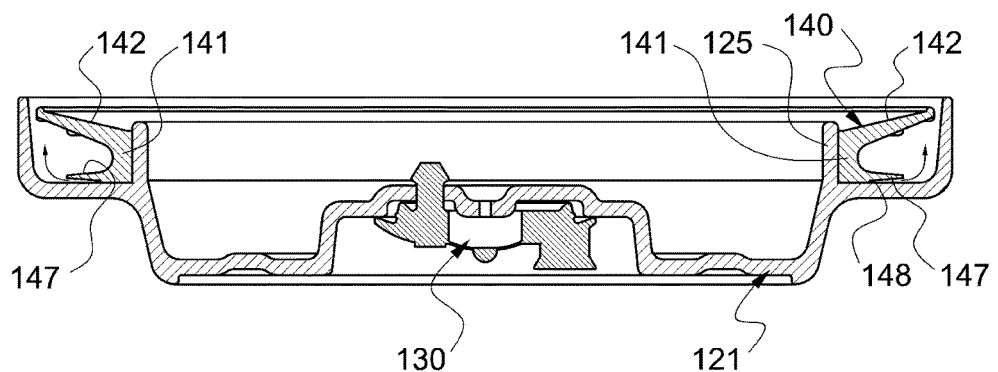
Figure 11:
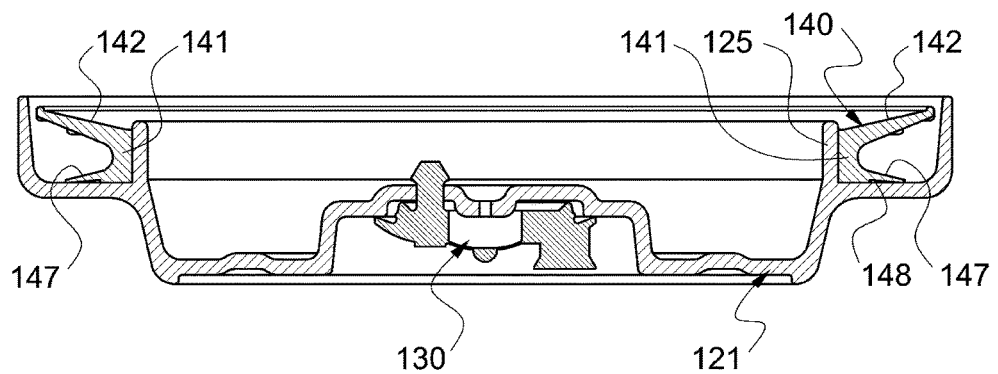

In the state illustrated in FIG. 9, when the rubber seal 140 is pressed to be further lowered, the outer peripheral edge of the multi-functional wing portion 147, which is formed to be thin, is lifted as illustrated in FIG. 10, and the air in the closed space CS escapes to the outside as illustrated by arrow.

When the pressed state is released after the body portion 141 of the rubber seal 140 is fully pressed, a negative pressure is developed in the adhesion recess 148 and thus, the multi-functional wing portion 147 may be adhered to the bottom surface of the lid body 121.

That is, the multi-functional wing portion 147 of the inventive rubber seal 140 performs a dual sealing function of the lid body 121 and the rubber seal 140, prevents the seal rubber 140 from being released from the seal mounting portion 125 by being adhered to the bottom surface of the lid body 121, and supports the body portion 141 in such a manner that the body portion 141 is prevented from bulging outward.

Figure 12:
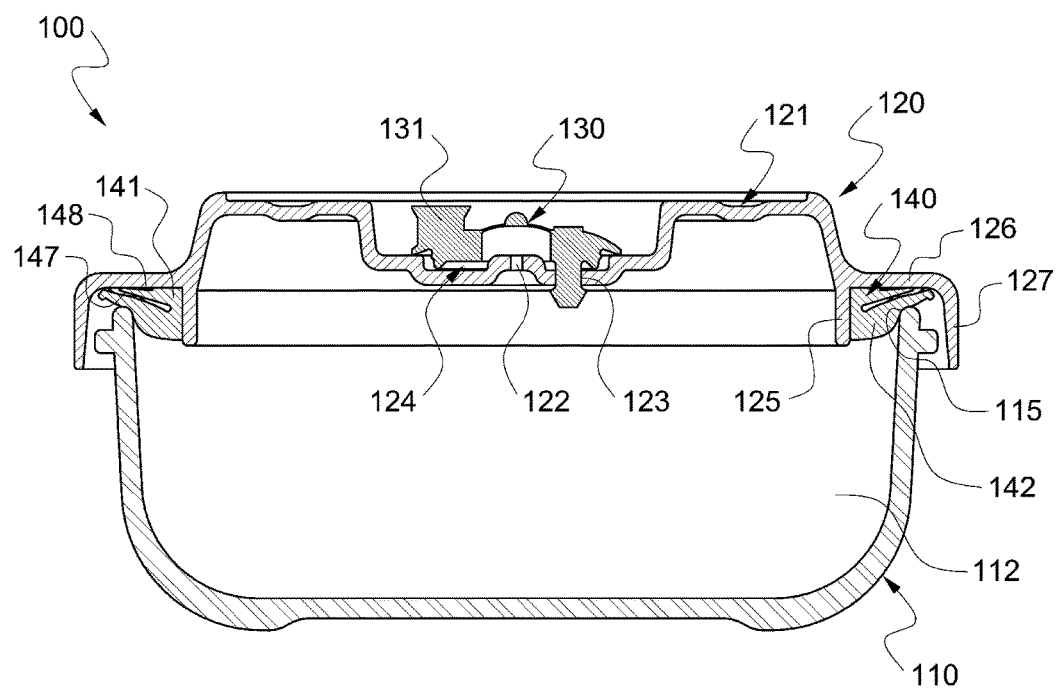
FIG. 12 is a cross-sectional view of the vacuum receptacle closed by the inventive lid.

FIG. 12 is a cross-sectional view of the vacuum receptacle in the state where the inventive lid 120 is closed.

When the lid 120 is lowered in the state illustrated in FIG. 3, the elastic sealing wing portion 142 comes into contact with the peripheral edge 115 of the opening 114 of the receptacle body 110, thereby shielding the inner space 112 from the outside of the receptacle body 110. In this state, when the lid 120 is pressed fully, the volume enclosed by the receptacle body 110 and the lid 120 is reduced, and thus the air existing inside the receptacle body 110 is compressed and thus, escapes to the outside through the vent hole 122 while pushing the check valve 130 upward.

When the lid 120 is pressed fully, the elastic sealing wing portion 142 is pushed upward by the peripheral edge 115 of the opening 114 of the receptacle body 110 to be bent upward to the utmost with reference to the body portion 141 so that the outer peripheral edge of the elastic sealing wing portion 142 comes into contact with the bottom surface of the lid body 120. When the force applied to press the lid 120 is removed, the lid 120 is slightly lifted by the elastic force of the elastic sealing wing portion 142. Therefore, a negative pressure is developed in inner space 112 of the receptacle body 110, and the check valve 130 shields the vent hole 122 from the outside.

In addition, the elastic sealing wing portion 142 is elastically contacted with the peripheral edge 115 of the opening 114 of the receptacle body 110 by the elastic force biased from the inside to the outside of the peripheral edge 115 of the opening 114 of the receptacle body 110, thereby blocking the gap between the receptacle body 110 and the rubber seal 140 and thus sealing the inner space 112 of the receptacle body 110.

In the state illustrated in FIG. 12, the space between the elastic sealing wing portion 142 and the multi-functional wing portion 147 is communicated with the ambient air through the above-mentioned ventilation portions 143. Accordingly, when the lid 120 is opened, the elastic sealing wing portion 142 is returned to its initial position as illustrated in FIG. 3 by its elasticity without any interruption.

In the state illustrated in FIG. 12, the body portion 141 fitted on the seal mounting portion 125 serves to fix the rubber seal 140 to the lid body 121, and the inner circumferential surface of the body portion 141 comes into close contact with the outer circumferential surface of the seal mounting portion 125, thereby serving to primarily seal the gap between the lid body 121 and the rubber seal 140.

In addition, the multi-functional wing portion 147 comes into close contact with the bottom surface of the laterally extending portion 126 of the lid body 121, thereby performing a secondarily sealing function of the gap between the lid body 121 and the rubber seal 140. In addition, the multi-functional wing portion 147 forms an adhesion space with the bottom surface of the lid body 121 through the adhesion recess 148, thereby performing a function of preventing the rubber seal 140 from being released downward from the seal mounting portion 125 even when a negative pressure is developed in the inside of the vacuum receptacle 100. Furthermore, the multi-functional portion 147 supports the body portion 141, thereby performing a function of preventing the body portion 141 from bulging outward.

When it is desired to develop a high negative pressure in the vacuum receptacle 100, it is possible to forcibly discharge the air in the vacuum receptacle 100 by mounting a pump on the valve mounting portion 124 to enclose the check valve 130.

In the state as illustrated in FIG. 12, when it is desired to open the lid 120, the knob 131 of the check valve 130 may be slightly lifted by hand in such a manner that the ambient air may flow into the inside of the vacuum receptacle 100 through the through-hole 122 so as to release the negative pressure developed in the inside of the vacuum receptacle, and then the lid 120 may be separated from the receptacle body 110.

MODE FOR INVENTION

Figure 13:
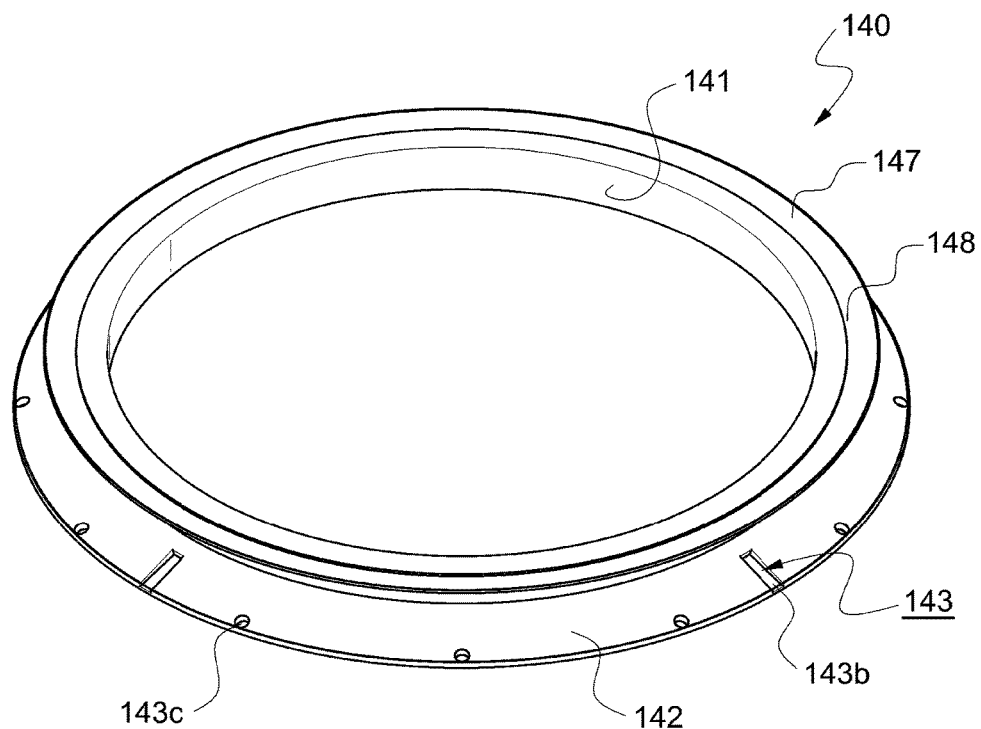
FIG. 13 is a perspective view of the inventive rubber seal illustrating another example of a ventilation portions.

FIG. 13 is a perspective view illustrating another example of the ventilation portions.

Alternatively, the ventilation portions 143 may be configured by forming radial grooves 143b to extend to the outer periphery of the elastic sealing wing portion 142 or forming holes 143c along the peripheral edge of the elastic sealing wing portion 142 rather than forming the rims 143a on the top surface of the elastic sealing wing portion 142.

Of course, the ventilation portions 143 may be configured by using in combination two or more of the grooves 143b, the holes 143c, and the rims 143a described above.

The remaining configurations or functional actions are the same as those described with reference to FIGS. 3 to 7.

Figure 14:
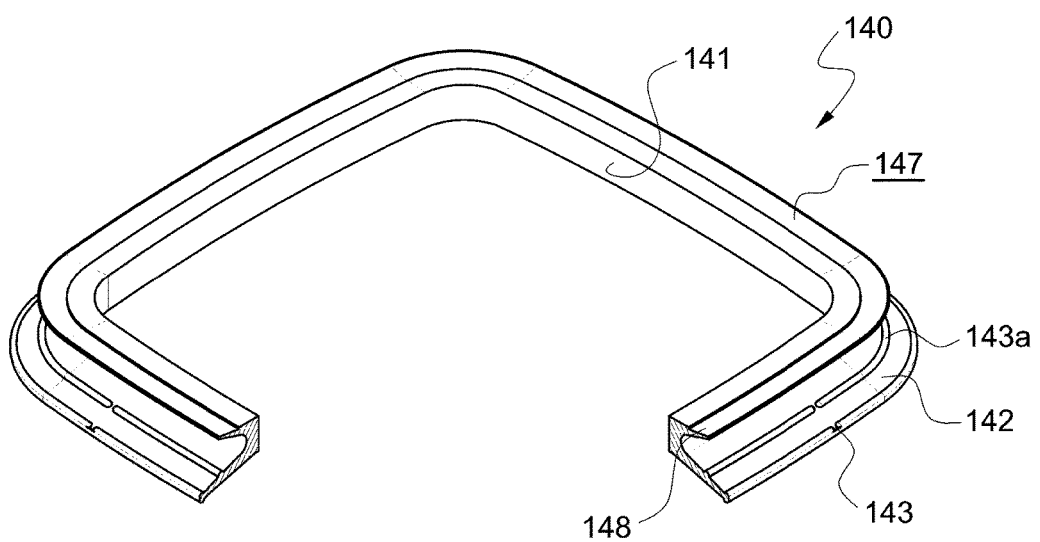
FIG. 14 is a perspective view illustrating another example of the inventive rubber seal partially in cross-section.
Figure 15:
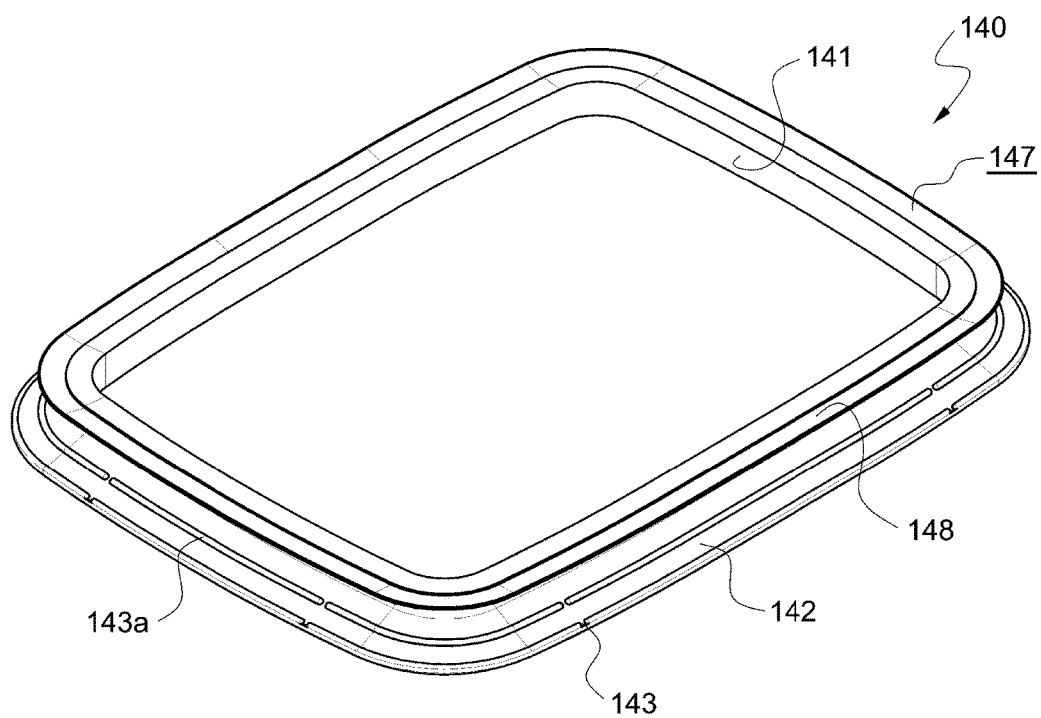
FIG. 15 is a perspective view illustrating still another example of the inventive rubber seal.

FIG. 14 is a perspective view illustrating another example of the inventive rubber seal partially in cross-section, and FIG. 15 is a perspective view illustrating still another example of the inventive rubber seal.

The inventive rubber seal 140 may be formed in a square shape as illustrated in FIG. 14 or in a rectangular shape as illustrated in FIG. 15 according to the shape of the seal mounting portion formed in the receptacle body. The other configurations or functional actions are the same as those described with reference to FIGS. 3 to 7.

Referring to the above-described exemplary embodiments, it will be appreciated that the rubber seal 140 may be formed in another shape, for example, an oval shape according to the shape of the seal mounting portion formed in the receptacle body.

INDUSTRIAL APPLICABILITY

The inventive rubber seals may be used for fabricating a vacuum receptacle in order to seal the receptacle in such a manner that food in the receptacle can be stored for a long period.

The invention claimed is:

1. A rubber seal installed in a lid body of a lid of a vacuum receptacle to seal a gap between a receptacle body and the lid body in such a manner that, when the lid is closed, the inner space of the vacuum receptacle can be shielded from the outside, wherein the rubber seal comprises:

a body portion configured to surround the lateral side of an inner space and to extend vertically, and fitted on the outer circumferential surface of a seal mounting portion formed to extend downward in the lid body such that the inner circumferential surface of the body portion comes into close contact with the outer circumferential surface of the seal mounting portion, thereby primarily sealing a gap between the lid body and the rubber seal;

an elastic sealing wing portion formed to extend outward from the bottom side of the body portion and provided along the circumference of the body portion such that the elastic sealing wing portion elastically comes into close contact with the edge of an opening of the receptacle body, thereby sealing a gap between the receptacle body and the rubber seal; and a multi-functional wing portion formed to protrude outward from the body portion above the elastic sealing wing portion and provided along the circumference of the body portion such that the multi-functional wing portion comes into contact with the bottom surface of the lid body, thereby secondarily sealing the gap between the lid body and the rubber seal and supporting the body portion to suppress the body portion from bulging outward, wherein an adhesion recess is formed on the top surface of the multi-functional wing portion in such a manner that when the multi-functional wing portion is in contact with the bottom surface of the lid body, a sealed adhesion space is formed between the bottom surface of the lid body and the multi-functional wing portion.

2. The rubber seal as claimed in claim 1, wherein the multi-functional wing portion extends to be inclined in such a manner that the height of the multi-functional wing portion is gradually increased as approaching the outer periphery of the multi-functional wing portion.

3. The rubber seal as claimed in claim 1, wherein the multi-functional wing portion is formed in such a manner that the thickness of the multi-functional wing portion is reduced as approaching the outer periphery thereof so as to serve as a check valve that, when the outer peripheral edge of the multi-functional wing portion is in close contact with the bottom surface, allows the air in the adhesion recess to flow out to the outside and prevents the ambient air from flowing into the adhesion recess.

4. The rubber seal as claimed in claim 1, wherein the thickness of the multi-functional wing portion is reduced as approaching the outer periphery of the multi-functional wing portion.

5. The rubber seal as claimed in claim 1, wherein the elastic sealing wing portion extends to be inclined in such a manner that the height of the elastic sealing wing portion is gradually reduced as approaching the outer periphery thereof.

6. The rubber seal as claimed in claim 1, wherein the thickness of the elastic sealing wing portion is reduced as approaching the outer periphery of the elastic sealing wing portion.

7. The rubber seal as claimed in claim 1, the elastic sealing wing portion is formed with one or more ventilation portions to allow a space formed between the elastic sealing wing portion and the multi-functional wing portion to be always communicated with an outer space.

8. The rubber seal as claimed in claim 7, wherein the ventilation portions are formed by passages between rims formed on the top surface of the elastic sealing wing portion to protrude upward, one or more radial grooves formed to extend from the top surface of the elastic sealing wing portion to the outer periphery of the elastic sealing wing portion, or one or more holes formed along the outer peripheral edge of the elastic sealing wing portion.

9. A lid for a vacuum receptacle for opening or closing an opening of a receptacle body provided with a space in which contents are stored, wherein the lid comprises:
a lid body including a valve mounting portion formed with a vent hole and a valve coupling portion, a seal mounting portion formed along the periphery of the bottom surface of the valve mounting portion and extending downward, and a laterally extending portion extending outward from the seal mounting portion;
a check valve mounted on the valve coupling portion to allow the air in the vacuum receptacle to be discharged to the outside through the vent hole while preventing the ambient air from flowing into the inside of the vacuum receptacle; and
a rubber seal, wherein the rubber seal comprises:
a body portion fitted on the outer circumferential surface of the seal mounting portion to come into close contact with outer circumferential surface of the seal mounting portion, thereby primarily sealing a gap between the lid body and the rubber seal;
an elastic sealing wing portion formed to extend outward from the bottom side of the body portion and provided along the circumference of the body portion such that the elastic sealing wing portion elastically comes into close contact with the edge of the opening of the receptacle body as the lid body moves downward, thereby blocking the infiltration of the ambient air into the inside of the vacuum receptacle through a gap between the receptacle body and the rubber seal; and
a multi-functional wing portion formed to protrude outward from the body portion above the elastic sealing wing portion and provided along the circumference of the body portion such that the multi-functional wing portion comes into contact with the bottom surface of the lid body, thereby secondarily sealing the gap between the lid body and the rubber seal and supporting the body portion to suppress the body portion from bulging outward,
wherein an adhesion recess is formed on the top surface of the multi-functional wing portion in such a manner that, when the multi-functional wing portion is in contact with the bottom surface of the lid body, a sealed adhesion space is formed between the bottom surface of the lid body and the multi-functional wing portion.

10. The rubber seal as claimed in claim 9, wherein the multi-functional wing portion is formed in such a manner that the thickness of the multi-functional wing portion is reduced as approaching the outer periphery of the multi-functional wing portion, thereby serving as a check valve that, when the outer peripheral edge of the multi-functional wing portion is in close contact with the bottom surface, allows the air in the adhesion recess side to flow out to the outside while preventing the ambient air from flowing into the adhesion recess side.

11. The lid as claimed in claim 9, wherein the elastic sealing wing portion is formed with one or more ventilation portions to allow a space formed between the elastic sealing wing portion and the multi-functional wing portion to be always communicated with an outer space.

* * * * *